(12) United States Patent
Romeiro (10) Patent No.: US 10,792,905 B1
(45) Date of Patent: Oct. 6, 2020

(54) PROCESS TO MANUFACTURE MULTILAYER LAMINATED PACKAGING MATERIAL

(71) Applicant: Sergio R. Romeiro, Sao Paulo (BR)

(72) Inventor: Sergio R. Romeiro, Sao Paulo (BR)

( * ) Notice: Subject to any disclaimer, the term of this patent is extended or adjusted under 35 U.S.C. 154(b) by 0 days.

(21) Appl. No.: 16/863,882

(22) Filed: Apr. 30, 2020

(51) Int. Cl.
*B32B 38/14* (2006.01)
*B32B 38/00* (2006.01)

(52) U.S. Cl.
CPC ............ *B32B 38/14* (2013.01); *B32B 38/145* (2013.01); *B29C 2795/00* (2013.01)

(58) Field of Classification Search
USPC .......................... 156/250, 256, 259, 270, 277
See application file for complete search history.

(56) References Cited

U.S. PATENT DOCUMENTS

| | | | | | |
|---|---|---|---|---|---|
| 3,902,947 | A | * | 9/1975 | Grot ......................... | B32B 27/00 156/213 |
| 4,258,848 | A | * | 3/1981 | Akao ....................... | B32B 27/32 206/524.2 |
| 4,387,126 | A | * | 6/1983 | Rebholz ................... | B32B 15/08 428/34.3 |
| 4,657,614 | A | * | 4/1987 | Andersson ............ | B32B 15/085 156/244.11 |
| 4,659,408 | A | * | 4/1987 | Redding .................... | B32B 1/02 428/461 |
| 4,917,247 | A | * | 4/1990 | Jud ..................... | B65D 75/5833 229/87.05 |
| 5,358,785 | A | * | 10/1994 | Akao ....................... | B29C 65/02 428/349 |
| 6,780,269 | B2 | * | 8/2004 | Kobayashi .............. | B32B 15/08 156/192 |
| 6,858,106 | B1 | * | 2/2005 | Ikenoya .................. | B32B 15/08 156/184 |
| 7,201,971 | B2 | * | 4/2007 | Frisk ......................... | B32B 7/10 428/532 |
| 7,323,235 | B2 | * | 1/2008 | Vaughn .............. | B42D 15/0053 283/56 |
| 2002/0127419 | A1 | * | 9/2002 | Kobayashi .............. | B32B 15/08 428/461 |

(Continued)

*Primary Examiner* — Sing P Chan
(74) *Attorney, Agent, or Firm* — Nevrivy Patent Law Group P.L.L.C.

(57) ABSTRACT

The invention provides a process to manufacture multilayer laminated packaging material to produce carton packages comprising the steps of: feeding a paperboard layer to a laminating equipment; laminating at least one inner layer onto a non-printable inner face of said paperboard layer, thereby forming a web of a multilayer laminated packaging material, wherein the at least one laminated inner layer forms a protective sealing and odour, light and gas barrier layer; winding said web of the multilayer laminated packaging material to form a master roll; feeding said master roll containing the web of the multilayer laminated packaging material to a printing equipment; printing a commercial artwork onto a printable outer face of the paperboard layer of the web of the multilayer laminated packaging material, opposed to said non-printable inner face; winding the printed web of the multilayer laminated packaging material to form a printed master roll; and slitting the printed master roll to form rolls of smaller width containing the web of the multilayer laminated packaging material.

26 Claims, 5 Drawing Sheets

(56) References Cited

U.S. PATENT DOCUMENTS

| | | | | |
|---|---|---|---|---|
| 2007/0243396 A1* | 10/2007 | Buchbinder | ............ | D21H 27/36 |
| | | | | 428/457 |
| 2015/0376357 A1* | 12/2015 | Ebata | ........................ | C08J 7/042 |
| | | | | 428/688 |
| 2018/0304607 A1* | 10/2018 | Ohman | .................... | B32B 27/34 |
| 2018/0311940 A1* | 11/2018 | Toft | ........................ | B65D 5/746 |
| 2018/0319559 A1* | 11/2018 | Toft | ........................ | B32B 29/005 |
| 2018/0354690 A1* | 12/2018 | Collaud | .................. | B32B 29/06 |
| 2019/0009961 A1* | 1/2019 | Ochsmann | ............ | B32B 27/306 |
| 2019/0016094 A1* | 1/2019 | Ochsmann | ............ | B32B 15/085 |
| 2019/0308786 A1* | 10/2019 | Okamoto | ............. | D21H 19/824 |
| 2020/0094536 A1* | 3/2020 | Toft | ........................ | B32B 27/10 |

\* cited by examiner

PRIOR ART

FIG. 2

PRIOR ART

PROCESS TO MANUFACTURE MULTILAYER LAMINATED PACKAGING MATERIAL

FIELD OF THE INVENTION

The field of the invention refers to a process to manufacture multilayer laminated packaging material. More particularly, the field of the invention relates to processes to manufacture multilayer laminated packaging material used to produce carton packages, in especially aseptic carton packages containing liquid or pasty products.

RELATED ART

It is well known the use of aseptic and disposable packages to pack different types of liquid or pasty products, notably in the dairy, juice or similar industries.

Aseptic packaging is a process in which a food product, such as UHT (Ultra High Temperature) milk, and its package is sterilized separately and then combined and sealed under sterilized atmosphere, what means that the product will be kept in a sterile condition, hermetically sealed in the package, in an environment free of microorganisms, pathogenic and non-pathogenic. If these aseptic packages are not hermetically sealed and the product is kept at room temperature, microorganisms will be able to develop in the package without refrigeration, during distribution and storage, spoiling the product before consumption. Hermetically sealed aseptic packaging prevents the passage of gases, fluids and microorganisms through the package, and consequently there is no chemical and biological contamination of the aseptically filled product.

A well-known type of aseptic packaging comprises packaging made out of a thin, fibrous laminated material, usually paper, to which is attached a second thin, highly resistant laminated material, usually aluminum, which serves as a barrier for oxygen and light. Usually layers of waterproof thermoplastic material are also applied in conjunction with this multilayer laminated material, which provides protection and impermeability to the packaging material. The number of layers and types of materials applied may vary according to the manufacturing needs.

The layer of paper is commonly referred to as paperboard, and comprises a first face of finished, less absorbent and printable outer face, usually referred to as the white face, due to the fact that it is generally white colored, and an opposed non-printable inner face, which may be referred to as the raw face.

Hereinafter the word "inner" is used to refer to the non-printable face of the paperboard layer and the layers laminated thereto, and the word "outer" is used to refer to the printable face of the paperboard layer and the layers laminated thereto.

An artwork is printed onto the printable outer face of the paperboard layer, serving to identify the product that will be packaged into the finished aseptic carton packages which will be manufactured from the multilayer laminated packaging material.

According to a well-known process to continuously manufacture a web of multilayer laminated packaging material used to produce aseptic carton packages, initially the artwork is printed in the printable outer face of the paperboard layer using a flexographic printing process. Usually this printing step is made in expensive broadband flexographic printers, which have the capacity to continuously print large width paperboard layers.

The first cylinder of color application of the flexographic printers, defined as the master cylinder, usually printing black color for the artwork, may also print photocell marks or registers which will be used by the following cylinders that print other colors, defined as slave cylinders. The registers will be further used to orientate some of the following operations of the process, as well as serve to orientate some operations in filling machines where the web of multilayer laminated packaging material is used to produce aseptic carton packages, as will be noticed hereafter.

Since the printing is made directly onto the printable outer face of the paperboard layer, the printing operation usually is made with environment friendly water-based ink, instead of solvent-based ink. If solvent-based ink were used there would be a risk that organic compounds can migrate to the inner part of the paperboard layer, which could cause problems.

A drawback with water-based inks is that such inks are much more difficult to dry after application of each color, causing a reduction in the printing speed of the printer, even if the printer is provided with blowers, located after every color-printing station, intended to provide a massive flow of hot air towards the printable outer face of the paperboard layer, where the artwork is being printed.

After the printing operation finishes, a creasing operation is made onto the non-printable inner face of the paperboard layer to create folding lines that will form the edges of the carton packages which eventually will be produced from the multilayer laminated packaging material.

Creases are necessary to form the folding lines of the aseptic carton packages which will be produced from the web of multilayer laminated packaging material. In this process the side edges of the multilayer laminated packaging material are superimposed and adhered to each other, by means of heat and pressure, to form a tunnel. Next, the tunnel is continuously filled with the product to be contained in the aseptic carton packages under production. Molding, sealing and cutting devices are used to continuously mold, seal and cut semi-finished aseptic carton packages from the tunnel, which in the following steps will undergo finish operations to take their final shape.

If necessary, holes may also be punched in the paperboard layer at the creasing station of the machinery, which will serve to facilitate the passage of elements that will perforate the aluminum layer of the finished packages manufactured from the multilayer laminated packaging materials, such as straws or cutting devices from closures, thereby allowing the product into the package to be served.

After the printing, creasing and punching operations are finished, next begins the process to continuously laminate the multiple layers which will form the web of multilayer laminated packaging material for manufacturing carton packages. The paperboard is heat treated in order to facilitate the thermoplastic layers and the aluminum layer to adhere to it. Usually, in this well-known process the heat treating comprises flame treating.

According to this well-known process, layers of thermoplastic material, usually polyethylene, are laminated together with the layer of paperboard and the aluminum inner layer; in that the non-printable inner face of (i) the paperboard layer is heat treated, (ii) an inner layer of adhesive thermoplastic material is used between the non-printable inner face of the paperboard layer and one of the faces of the (iii) aluminum inner layer, which serves as an adhesive between the paperboard layer and the aluminum inner layer, (iv) an adhesive inner layer in the other face of the aluminum inner layer is applied to allow a further (v)

inner layer of thermoplastic material to be applied to the opposed face of the aluminum inner layer, which serve as a protective sealing inner layer, and (vi) an outer layer of thermoplastic material with thermo-sealing capacity is superposed on the printed printable outer face of the paperboard layer, also serving to protect it against humidity and scratching. Therefore, the multilayer laminated packaging material produced according to this process comprises six (6) layers.

In the continuity of the laminating process, the web of multilayer laminated packaging material is being rolled up as the multiple layers are laminated. At the end of the laminating process a roll of large width is formed, named master roll, which is transferred to a slitting section, where the master roll is slit in a plurality of rolls of smaller width and diameter. Next, these rolls are wrapped in shrinkable plastic, and next the slit rolls can be forwarded to the client company that had ordered such multilayer laminated packaging material to produce aseptic carton packages.

Both the printing and laminating equipment used in the process described heretofore to perform the printing and laminating steps for the preparation of the web of multilayer laminated packaging material are very expensive, requiring an investment of around US$50 million to buy and install them in a facility. In short, the process requires the use of a broadband flexographic printing equipment, comprising a number of color-printing stations provided with hot air blowers, and a multilayer laminating section comprising a broadband multilayer laminating equipment with a number of laminators in sequence, which makes it a weighty and lengthy equipment.

The use of broadband flexographic printing equipment is necessary because the laminating equipment is designed to laminate rolls of multilayer laminated packaging material having very large width, in order to increase productivity.

A drawback observed in the process described heretofore is the fact that the laminating operation to form the multilayer laminated packaging material is carried out after the creasing operation, which impairs the final quality of the multilayer laminated packaging material. The provision of folding lines onto the non-printable inner face of the paperboard layer make it not totally even, as a result of depressions being formed in the regions where folding lines were carried out.

This causes some difficulties to laminate the other layers onto the paperboard layer, particularly into the depressions of the folding lines. The thermoplastic layers may stretch into the depressions of the folding lines, but this is particularly more critical regarding the aluminum layer, which is not as stretchable as the plastic layers.

Another drawback of this process is that the necessity to frequently laminate webs of paperboard layer having different layouts as the ones previously laminated causes significant downtime in the operation of the laminating equipment, causing an increase in the operating costs of a very expensive piece of equipment. For that reason, the laminating equipment is designed to operate for very long runs, as the lesser it is idle, the better.

However, frequently is necessary to laminate different patterns of multilayer laminated packaging material, in special when not only the artwork is different, being also different the layout of the blank of the carton packages that eventually will be produced from the multilayer laminated packaging material.

When such situations occur, inevitably it will take a substantial period of time for adapting the laminating equipment to laminate the new multilayer laminated packaging material, an idle time in the range of 20 minutes. In this meantime no multilayer laminated packaging material is produced, material that would be enough to manufacture at least two thousand carton packages.

As for the broadband flexographic printing equipment, it is also an expensive piece of equipment. Usually manufactures have to use more than one flexographic printing equipment to work in conjunction with a single laminating equipment, thereby causing a substantial increasing in the costs.

In view of this drawback, the manufacturers of multilayer laminated packaging material tend to schedule continuous production runs of the largest possible quantity of multilayer laminated packaging material that preferably contains the same layout and artwork so as to avoid operational downtime of the printing and laminating equipment.

Alternatively, manufactures attempt to laminate a sequence of webs of multilayer laminated packaging material that preferably contains the same layout, even if the artwork is different, which reduces the downtime of the laminating equipment.

Further, in order to rationalize the production, it is usual that manufacturers of multilayer laminated packaging material establish minimum order quantity (MOQ) to ensure that they make a profit off of each production run of multilayer laminated packaging material.

However, frequently the MOQ established by the manufacturer is much larger than the needs of the client companies that will produce aseptic carton packages from MOQ of multilayer laminated packaging material.

In consequence of this unbalanced situation, either the manufactures of multilayer laminated packaging material have to accept orders of smaller quantities of multilayer laminated packaging material, or the clients must place orders according to the MOQ stablished by the manufacturer, irrespective of the fact that the MOQ exceed their production capacity for a reasonable period of time, making them to have a considerable stock of multilayer laminated packaging material, thereby increasing costs.

As a considerable number of clients are unable to place orders according to the MOQ, frequently the manufacturers must accept orders of smaller quantities of different multilayer laminated packaging material for a number of different clients, and, consequently, it causes a substantial downtime, as it takes a substantial period of time to adapt the printing equipment for each different layout of the blank of the carton package.

A possible solution for this problem is to have more than one broadband flexographic printing equipment in the facilities, in order to reduce downtime of the very expensive laminating equipment. In this case, while at least one flexographic printing equipment is printing the artwork and creasing a paperboard layer then in use in a current lamination in the laminating equipment, at least one extra flexographic printing equipment would be printing a different artwork and making folding lines onto the non-printable inner face of some other paperboard layers. When the lamination in course finishes, there will be sufficient rolls of the new printed artwork to start a new laminating process for a different multilayer laminated packaging material.

Although the use of more than one broadband flexographic printing equipment can reduce downtime of the laminating equipment, this solution is expensive, due to the high cost of a broadband printing equipment.

According to another well-known process to manufacture multilayer laminated packaging material used to produce aseptic carton packages, firstly photocell marks or registers are printed in the printable outer face of the paperboard layer, which are necessary for the following steps of rotogravure printing, creasing and cutting. If the finished aseptic carton packages will require the use of straws or closures, then holes are also punched in the paperboard layer, prior to start the continuous laminating process of multiple layers which will form the multilayer laminated packing material.

Next, the multiple layers that will form the web of multilayer laminated packaging material are laminated in sequence. First, the non-printable inner face of the paperboard layer is heat treated, then an outer layer of a thermoplastic material, usually a polyethylene, is laminated onto the printable outer face of the paperboard layer. Next, inner layers of aluminum and thermoplastic material are laminated onto the non-printable inner face of the paperboard layer.

At the end of the laminating process it is formed a roll containing a web of multilayer laminated packaging material of large width, which is next transferred to a rotogravure printing equipment, where the artwork is rotogravure-printed onto the thermoplastic outer layer which coats the printable outer face of the paperboard layer.

Usually this rotogravure printing operation is made in highly expensive broadband rotogravure printers, which have the capacity to continuously print paperboards of very large width. The rotogravure printing operation is made using solvent-based ink, which dries quickly. In a following step, high chemical and scratch-resisting varnish is applied onto the already printed layer of thermoplastic material that coats the printable outer face of the paperboard layer.

At the end of the rotogravure printing operation it is formed a roll of large width containing a web of multilayer laminated packaging material, which is slit to form rolls of smaller width. In a following step the rolls of smaller width are transferred to a creasing station, where the non-printable inner face of the multilayer laminated packaging material is creased to form folding lines which will form the edges of the carton packages that eventually will be produced in filling machines.

Next, the roll containing the web of multilayer laminated packaging material is cut in blanks, which are stacked up in separate stacks. In the sequence the stacks of blanks are fed to a pre-folding station, where the blanks are aligned to enter in a heat station.

The thermoplastic material that coats the faces of the printed and creased blanks are activated in the heat station in order to enable adhesion between the longitudinal edges of the opposite faces of the blanks. With the heat activation of said thermoplastic material, the longitudinal edges are juxtaposed and adhered to each other in a following final folding station, to form longitudinal regions of joining and sealing.

In this operation semi-formed carton packages are formed, having its upper and lower parts open, which are next flattened and packed to be forwarded to clients that will use them to produce aseptic carton packages in dedicated aseptic filling machines.

A drawback observed in this second process is the use of a highly expensive broadband rotogravure printing equipment, which comprises a number of color-printing units that operate with a very high tension on the multilayer laminated packaging material for printing the artwork onto the polyethylene layer on the printable outer face of the paperboard.

This high tension on the multilayer laminated packaging material is necessary to guarantee that the colors printed in the rotogravure color-printing units will be applied accordingly. The photocells registers serve to guide the color-printing operation in each of the color-printing units. Depending on the instant photocell reading, more or less tension is applied on the web of multilayer laminated packaging material through the rolls of each color-printing unit so as to guarantee that each color ink will be applied accordingly to form the final artwork.

Therefore, it was noted that the second process described in the previous paragraphs requires the use of a very expensive multilayer laminating equipment, similar to the equally very expensive multilayer laminating equipment required for the implementation of the process described anteriorly.

Further, this second process also requires the use of a highly expensive printing equipment, as well as a highly expensive and complex machinery to cut, separate, pre-fold, flatten and pack the semi-formed carton packages of multilayer packaging material that will be used to produce aseptic carton packages, thereby increasing costs.

Whichever is the process to manufacture multilayer laminated packaging material, a problem that manufacturers face is the need to keep the relative humidity below 60% into the storehouses of paperboard rolls, in order to assure that the paperboard will not be damaged for absorbing water from a humid ambient, before being used in the laminating equipment.

Consequently, the multilayer laminated packaging material manufacturing plant must be located in an area of low relative humidity, or the storehouse of rolls of paperboard must be acclimatized to control the relative humidity.

Considering that logistic costs and proximity with the clients are the two most important influencing factors to make the decision on where to install a plant, not the climate, frequently the decisions to install the plants in strategic locations cause them to be erected in regions of high relative humidity. Consequently, it is necessary to acclimatize the storehouse of rolls of paperboard, thereby increasing operating costs.

In view of the foregoing, it was noticed that both processes described heretofore have drawbacks that cause a substantial increase in capital expenditures (CAPEX) for ventures, such as very expensive laminating and printing equipment, acclimatization of storehouses, etc. Further, besides the operating costs for these pieces of equipment are equally high, excessive downtime, due to changes of printing and layout patterns, also contributes to increase costs.

Consequently, these drawbacks reduce the competitiveness of products packed in aseptic carton packages in comparison with other types of aseptic packages, such as cold-fill aseptic PET bottles, hot-fill PET bottles, cold-fill aseptic flexible pouch, hot-fill stand-up pouch, etc.

What is needed are new processes to manufacture multilayer laminated packaging material.

The foregoing description of the background is provided to aid in understanding the invention, and is not admitted to be or to describe prior art to the invention.

SUMMARY OF THE INVENTION

It is to be understood that both the foregoing general description of the invention and the following detailed description are exemplary, and thus do not restrict the scope of the invention.

In some embodiments, the present invention solves the problems previously mentioned that are observed in the currently known processes to manufacture multilayer laminated packaging material, as will be noticed from the following description of the embodiments of the invention.

In one aspect, the invention provides a process to manufacture multilayer laminated packaging material to produce carton packages comprising the steps of:
- feeding of a paperboard layer to a laminating equipment;
- laminating of a plurality of odour, light and gas barrier inner layer, adhesive inner layers and protective sealing inner layer onto the non-printable inner face of said paperboard layer, thereby forming a web of a multilayer laminated packaging material, wherein the laminating operation includes one operation from the group comprising heat treating the multilayer laminating packaging material, and applying an adhesive material between the layers
- winding of said web of a multilayer laminated packaging material to form a master roll;
- feeding of said master roll containing a web of a multilayer laminated packaging material to a printing equipment;
- printing of a commercial artwork onto the printable outer face of the web of paperboard layer of the multilayer laminated packaging material, opposed to said non-printable inner face;
- winding the printed web of the multilayer laminated packaging material to form a printed master roll; and
- slitting of the printed master roll to form rolls of smaller width containing a web of a multilayer laminated packaging material.

In another aspect, the invention provides a process to manufacture multilayer laminated packaging material to produce carton packages comprising the steps of:
- feeding of a paperboard layer to a laminating equipment;
- laminating of a plurality of odour, light and gas barrier inner layer, adhesive inner layers and protective sealing inner layer onto the non-printable inner face of said paperboard layer, thereby forming a web of a multilayer laminated packaging material, wherein the laminating operation includes one operation from the group comprising heat treating the multilayer laminating packaging material, and applying an adhesive material between the layers
- winding of said web of a multilayer laminated packaging material to form a master roll;
- slitting of the non-printed master roll to form rolls of smaller width containing a web of a multilayer laminated packaging material;
- feeding of each of said slit rolls containing a web of a multilayer laminated packaging material to a printing equipment;
- printing of a commercial artwork onto the printable outer face of the paperboard layer of the web of multilayer laminated packaging material, opposed to said non-printable inner face;
- winding of the printed web of the multilayer laminated packaging material to form a printed slit roll.

In another aspect, the invention provides a process to manufacture multilayer laminated packaging material to produce carton packages comprising the steps of:
- feeding of a paperboard layer to a laminating equipment;
- laminating of a plurality of odour, light and gas barrier inner layer, adhesive inner layers and protective sealing inner layer onto the non-printable inner face, and laminating of a thermoplastic protective sealing outer layer onto the printable outer face of said paperboard layer, thereby forming a web of a multilayer laminated packaging material, wherein the laminating operation includes one operation from the group comprising heat treating the web of multilayer laminating packaging material, and applying an adhesive material between the layers;
- winding of said web of a multilayer laminated packaging material to form a master roll;
- feeding of said master roll containing a web of a multilayer laminated packaging material to a printing equipment;
- printing of a commercial artwork onto the thermoplastic layer on the printable outer face of the web of paperboard layer of the multilayer laminated packaging material, opposed to said non-printable inner face;
- winding of the printed web of the multilayer laminated packaging material to form a printed master roll; and
- slitting of the printed master roll to form rolls of smaller width containing a web of a multilayer laminated packaging material.

In another aspect, the invention provides a process to manufacture multilayer laminated packaging material to produce carton packages comprising the steps of:
- feeding of a paperboard layer to a laminating equipment;
- laminating of a plurality of odour, light and gas barrier inner layer, adhesive inner layers and protective sealing inner layer onto the non-printable inner face of said paperboard layer, and laminating of a thermoplastic protective sealing outer layer onto the printable outer face of said paperboard layer, thereby forming a web of a multilayer laminated packaging material, wherein the laminating operation includes one operation from the group comprising heat treating the web of multilayer laminating packaging material, and applying an adhesive material between the layers;
- winding of said web of a multilayer laminated packaging material to form a master roll;
- slitting the non-printed master roll to form rolls of smaller width containing a web of a multilayer laminated packaging material;
- feeding of said slit rolls of smaller width containing a web of a multilayer laminated packaging material to a printing equipment;
- printing of a commercial artwork onto the thermoplastic outer layer on the printable outer face of the web of paperboard layer of the multilayer laminated packaging material, opposed to said non-printable inner face;
- winding of the printed web of the multilayer laminated packaging material to form a printed slit roll.

In another aspect, the invention provides a multilayer laminated packaging material produced according to any of the processes of the invention as described herein.

In another aspect, the invention provides a carton package comprising a multilayer laminated packaging material produced according to any of the processes of the invention as described herein.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE FIGURES

The skilled artisan will understand that the drawings, described below, are for illustration purposes only. The drawings are not intended to limit the scope of the present teachings in any way.

DETAILED DESCRIPTION OF THE INVENTION

Reference will now be made in detail to embodiments of the invention which, together with the drawings and the following examples, serve to explain the principles of the invention. These embodiments describe the invention in sufficient detail to enable those skilled in the art to practice the invention, and it is understood that other embodiments may be utilized, and that structural and chemical changes may be made without departing from the spirit and scope of the present invention. Unless defined otherwise, all technical and scientific terms used herein have the same meanings as commonly understood by one of ordinary skill in the art.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used). The use of the word "a" or "an" when used in conjunction with the term "comprising" in the claims and/or the specification may mean "one", but it is also consistent with the meaning of "one or more", "at least one" and "one or more than one". The use of the term "or" in the claims is used to mean "and/or" unless explicitly indicated to refer to alternatives only or the alternatives are mutually exclusive, although the disclosure supports a definition that refers to only alternatives "and" and "and/or". As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Furthermore, where the description of one or more embodiments uses the term "comprising", those skilled in the art would understand that, in some specific instances, the embodiment or embodiments can be alternatively described using the language "consisting essentially of" and/or "consisting of" as used herein, the term "about" means at most plus or minus 10% of the numerical value of the number with which it is being used.

It is contemplated that any method or composition described herein can be implemented with respect to any other method or composition described herein.

Figure 1A:
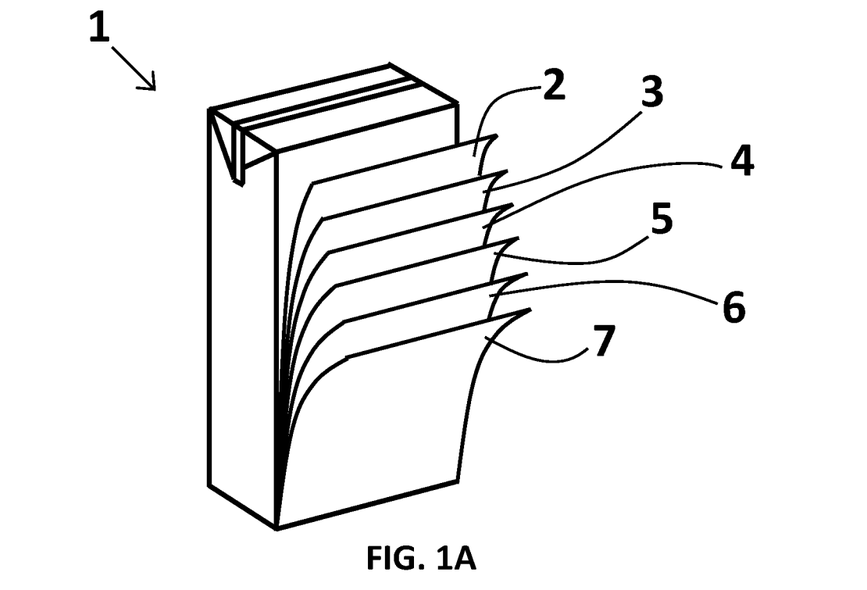
FIG. 1A depicts a schematic perspective view of an aseptic carton package showing the pared multiple layers that form the multilayer laminated packaging material used to produce the aseptic carton package.

Prior to describing the embodiments of the present invention, reference is made to FIGS. 1A, 1B, 2 and 3. FIG. 1A depicts a schematic perspective view of an aseptic carton package 1 well known in the art. It is shown in the FIG. 1B a projection of the separate layers that compose the multilayer laminated packaging material of the front panel of the aseptic carton package 1.

Figure 1B:
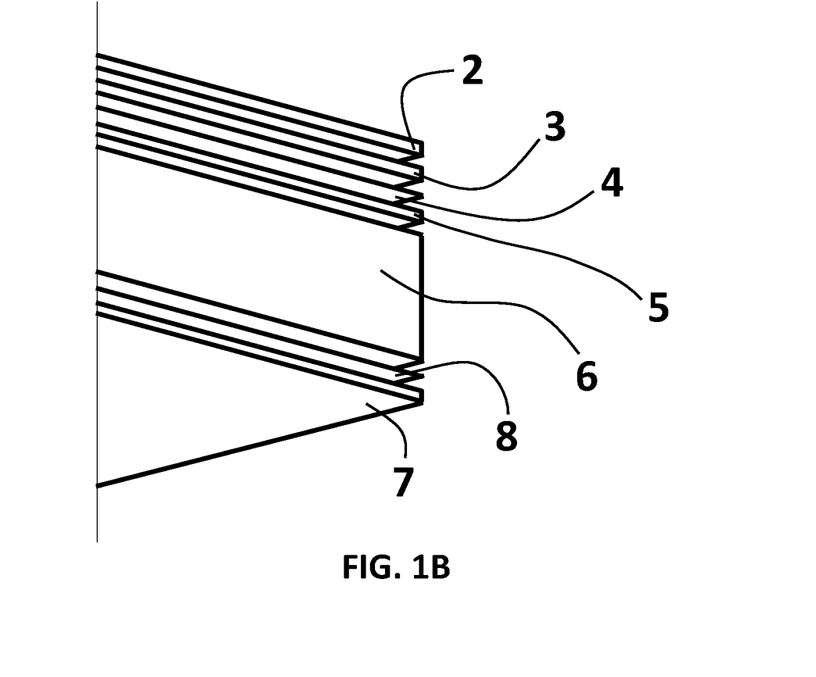
FIG. 1B depicts a schematic enlarged view of a cross section showing separately the multiple layers that form the multilayer laminated packaging material.

From the inside to the outside, it can be seen a thermoplastic protective sealing inner layer 2, a first thermoplastic adhesive inner layer 3, serving as an adhesive layer between the thermoplastic protective sealing inner layer 2 and a thin oxygen, light and gas barrier inner layer 4. It can also be seen a second thermoplastic adhesive inner layer 5 serving as an adhesive layer between the oxygen, light and gas barrier inner layer 4 and the non-printable inner face of a paperboard layer 6.

A thermoplastic protective sealing outer layer 7 coats the printable outer face of the paperboard layer 6. The thermoplastic protective sealing inner layer 2, the first thermoplastic adhesive inner layer 3, the second thermoplastic adhesive inner layer 5 and the thermoplastic protective sealing outer layer 7 usually are made of polyethylene. The oxygen, light and gas barrier inner layer 4 usually is made of aluminum.

All these layers had been laminated in a laminating equipment to form a web of multilayer laminated packaging material wherefrom came the blank used to produce the aseptic carton package 1.

FIG. 1B depicts a schematic enlarged view of a cross section showing separately the multiple layers mentioned above that form a web of multilayer laminated packaging material manufactured according to a process known in the art. It is shown an artwork 8 printed onto the printable outer face of the paperboard layer 6 underneath of the thermoplastic protective sealing outer layer 7.

In an alternative process to manufacture webs of multilayer laminated packaging material, the artwork 8 is printed after the lamination of the thermoplastic outer layer 7 onto the printable outer face of the paperboard layer 6. In this case, the artwork will be printed onto the thermoplastic outer layer 7.

Figure 2:
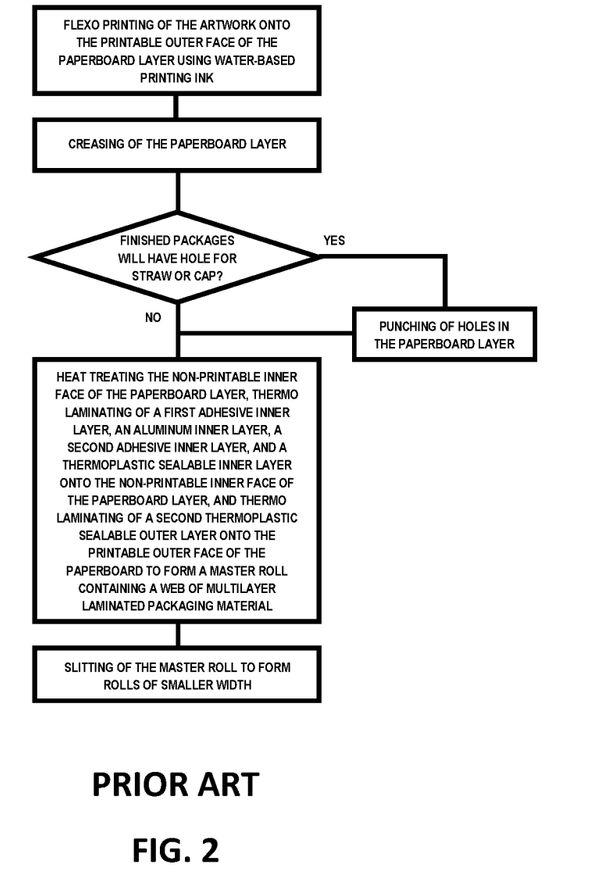
FIG. 2 depicts a block diagram showing the steps of a first process to manufacture multilayer laminated packaging material known in the art.
Figure 3:
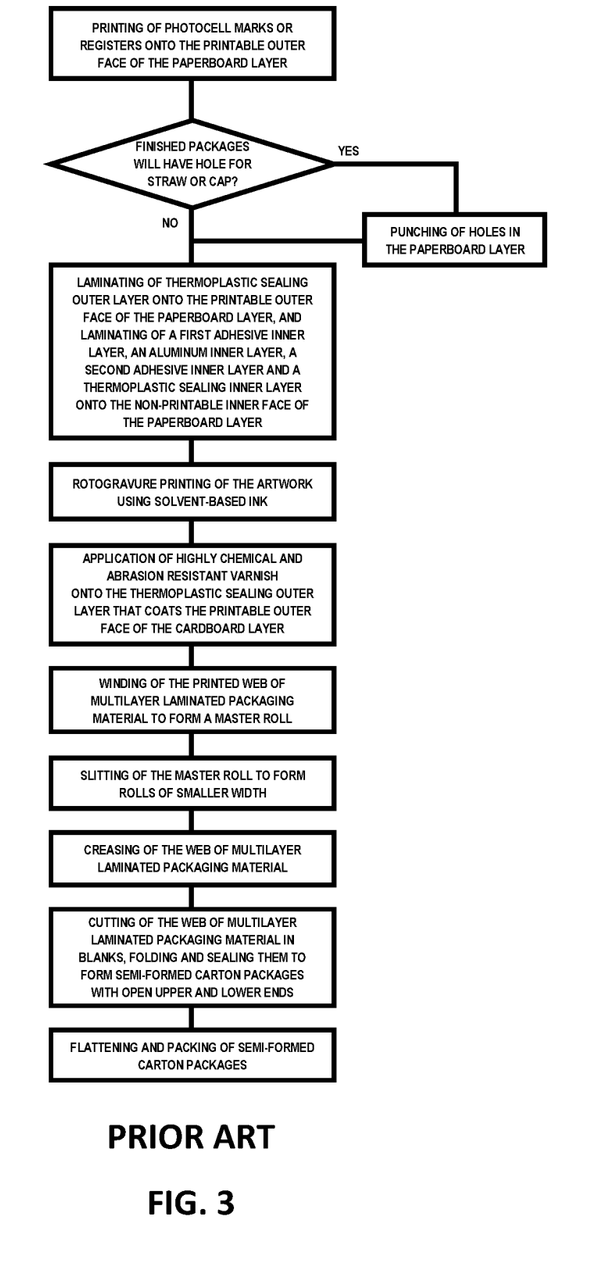
FIG. 3 depicts a block diagram showing the steps of a second known process to manufacture multilayer laminated packaging material in the art.

FIGS. 2 and 3 depict block diagrams showing the steps of the previously mentioned processes to manufacture webs of multilayer laminated packaging material well known in the art.

According to the process shown in FIG. 2, the printing of the artwork onto the printable outer face of the paperboard layer is made using water-based ink using flexo-printing equipment. Next the paperboard layer is creased to form folding lines that will serve to facilitate the future production of aseptic carton package.

If the packages will have holes for caps or straws, then said holes are punched before the multiple layers mentioned above are laminated in sequence onto both faces of the paperboard layer to form a master roll containing a web of multilayer laminated packaging material. During the laminating process, the web of paperboard layer usually is heat treated to heat, clean and dry the non-printable inner face of the paperboard layer, in order to facilitate adhesion of the thermoplastic adhesive inner layer. Next, the master roll is slit to form rolls of smaller width.

Notice that according to the process depicted in FIG. 2 the printing and creasing operations are made before the laminating operation of the multiple layers that will form the web of multilayer laminated packaging.

According to the alternative process shown in FIG. 3, initially photocell registers or marks are printed onto the printable outer face of the paperboard layer. If the packages will have holes for caps or straws, then said holes are punched before the multiple layers mentioned above are laminated in sequence onto both faces of the paperboard layer.

Next the artwork is printed onto the thermoplastic protective sealing outer layer that coats the printable outer face of the paperboard layer in rotogravure printing equipment using solvent-based ink. In a following step highly chemical and abrasion resistant varnish is applied to the thermoplastic protective sealing outer layer. Thereafter the web of multilayer laminated packaging material is winded to form a master roll. In the sequence, the master roll is slit to form rolls of smaller width.

In a following step the web of multilayer laminated packaging material of each slit roll is unwound and fed to a cutting equipment which cuts blanks in sequence that are next heat treated to activate the material in order to enable the formation of semi-formed carton packages having its upper and lower parts open, which are next flattened and packed.

Notice that according to the process depicted in FIG. 3 is imperative the printing of photocell registers or marks at the very beginning of the process, irrespective of the finished packages will have or not holes for straws or caps. Further, the process requires the use of highly expensive rotogravure printing equipment.

Process Embodiments

Figure 4:
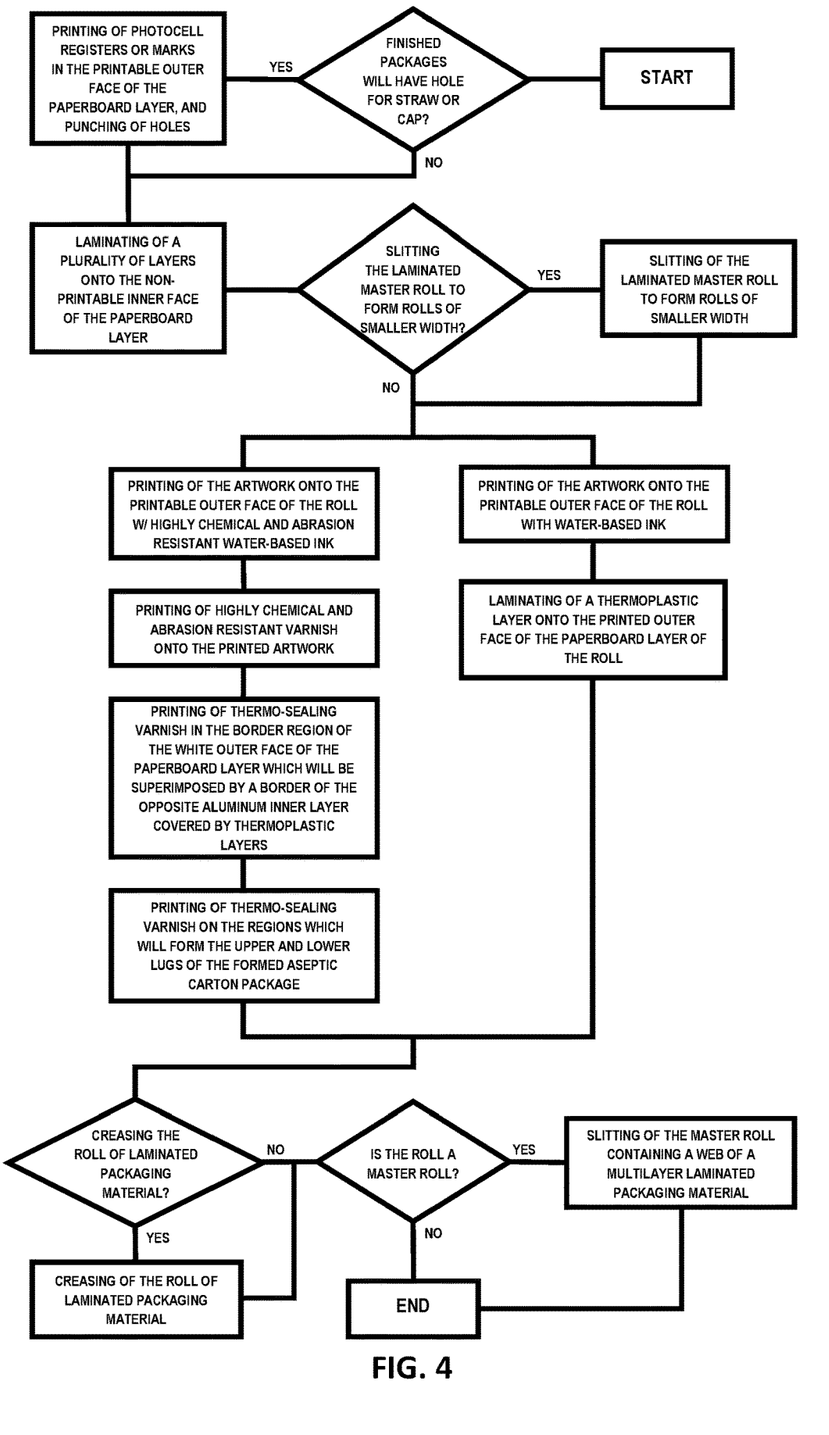
FIG. 4 depicts a block diagram showing the steps of two embodiments of the process to manufacture multilayer laminated packaging material object of the invention.

FIG. 4 depicts a block diagram showing the steps of two embodiments of the process of the present invention. Both embodiments of the process comprise a first step wherein it is checked if the finished aseptic carton packages will use caps or straws. If so, then photocell marks or registers are continuously printed, in the printable outer face of the paperboard layer, which will serve to orientate future printing operations with respect to said caps or straws which will occur after the laminating process, as will be described hereinafter.

Next, holes for caps or straws are continuously punched in the paperboard layer.

In a following step, the layer of paperboard is continuously fed to a laminating equipment in order to laminate at least one inner layer onto a non-printable inner face of said paperboard layer, thereby forming a web of a multilayer laminated packaging material, wherein the at least one laminated inner layer forms a protective sealing and odour, light and gas barrier inner layer.

This process may comprise a lamination in sequence of a plurality of layers onto the non-printable inner face of the paperboard layer, comprising i) one or more odour, light and gas (e.g., oxygen) barrier inner layers, ii) one or more adhesive inner layers and iii) one or more sealing inner layers, thereby forming a semi-finished web of multilayer laminated packaging material for manufacturing carton packages. These layers will form the inner layers of the aseptic carton packages eventually produced from the web of multilayer laminated packaging material.

In an exemplary composition, said multiple layers may comprise a first adhesive inner layer, an aluminum inner layer, a second adhesive inner layer, and a protective sealing inner layer, in order to form a semi-finished web of a multilayer laminated packaging material for manufacturing aseptic carton packages.

Preferably, the first and second adhesive inner layers and the protective sealing inner layer comprise thermoplastic layers. If so, said laminating operation comprises a operation consisting of laminating the first thermoplastic adhesive inner layer onto the non-printable inner face of the paperboard layer, laminating the aluminum inner layer onto the first thermoplastic adhesive inner layer, laminating the second thermoplastic adhesive inner layer onto the aluminum inner layer, and laminating the thermoplastic protective sealing inner layer onto the second thermoplastic adhesive inner layer.

The thermoplastic protective sealing inner layer serves both to internally sealing the aseptic carton packages and to protect the multilayer laminated packaging material against fortuitous aggressiveness of the product packaged into the aseptic carton packages, such as citric juices.

The semi-finished web of multilayer laminated packaging material may undergo a heat treatment to facilitate the first and second thermoplastic adhesive inner layers and the protective thermoplastic inner sealing layer to adhere to the paperboard layer and to the aluminum inner layer.

The semi-finished web of multilayer laminated packaging material may undergo a heat treatment to facilitate the first and second thermoplastic adhesive inner layers and the protective thermoplastic sealing inner layer to adhere to the paperboard layer and to the aluminum inner layer. The heat treatment may comprise, for exemplification only, flame treating or corona treating. The heat treatment also contributes to clean and dry the non-printable inner face of the paperboard layer.

Alternatively, instead of using the thermoplastic first and second adhesive inner layers in the multilayer laminated packaging material, which requires heat to activate the thermoplastic adhesive inner layers, it is possible to continuously apply a chemical adhesive material to form the first adhesive inner layer between the paperboard layer and the aluminum inner layer, and apply a chemical adhesive material to form the second adhesive inner layer between the aluminum inner layer and the protective sealing inner layer.

After winding the semi-finished web of a multilayer laminated packaging material in a master roll it is decided if the master roll will be or not slit to form rolls of smaller width. Whatever is decided, the master roll or the slit rolls will undergo the same printing operations in the following step, as will become apparent hereafter.

The steps described above are common for the first and the second embodiments of the process object of the present invention.

From this stage on there are different ways to embody the process to manufacture multilayer laminated packaging material object of the present invention, as will be noticed hereinafter.

First Embodiment of the Process Object of the Invention

According to a first embodiment of the process of the invention, after the formation of the master roll, or the slit rolls, it is not laminated with any thermoplastic sealing layer onto the printable outer face of the paperboard layer. At this stage the web of multilayer laminated packaging material may contain holes for the use of caps or straws, and then photocell marks or registers had been printed onto the printable outer face of the paperboard layer.

In a following step, the web of multilayer laminated packaging material wound in the master roll, or in the slit roll, is fed to a printing equipment, where an artwork is printed with highly chemical and abrasion resistant ink onto the printable outer face of the paperboard layer of the web of multilayer laminated packaging material. Preferably, the printing equipment is a flexographic printing equipment using water-based ink to print the artwork.

Next, protective highly chemical and abrasion resistant varnish is applied onto the artwork, followed by the application of thermo-sealing varnish onto the border regions of the paperboard layer which will be superimposed by a border of the opposite laminated non-printable inner face containing the odour, light and gas barrier inner layer, adhesive inner layers and protective sealing inner layer during a future tunneling process to produce aseptic carton packages using said multilayer laminated packaging material, made in dedicated filling machines. Thermo-sealing varnish is also applied onto the regions of the printable outer face of the multilayer laminated packaging material which will have to adhere to each other to form upper and lower folded triangular flaps of the finished aseptic carton packages that will be produced in dedicated filling machines.

Alternatively, the protective highly chemical and abrasion resistant varnish can be applied directly onto the printable outer face of the paperboard layer before the artwork is printed. Another possibility is to apply the protective highly chemical and abrasion resistant varnish onto the printable outer face of the paperboard layer before the laminating operation. Still a further possibility is to use a paperboard layer in that protective highly chemical and abrasion resistant varnish had been previously applied onto its printable outer face at the paperboard manufacturer's facilities.

Whichever is the varnish used onto the printable outer face of the paperboard layer of the multilayer laminated packaging material, it forms a protective sealing outer layer.

The following step may be a creasing operation onto the non-printable inner face of the web of multilayer laminated packaging material contained in the roll, be it a master roll or a roll of smaller width. The creasing operation form folding lines needed for the production of the finished aseptic carton packages in filing machines. The folding lines will form the edges of the aseptic carton packages.

It is possible that the creasing operation is made in the filing machine itself. In this case the web of multilayer laminated packaging material will not be creased during the execution of the present process to manufacture multilayer laminated packaging material.

Being or being not made a creasing operation in the web of multilayer laminated packaging material, next, if the roll is a master roll, then it may be stocked for future use or may be slit to form rolls of smaller width containing a finished web of multilayer laminated packaging material.

If in this stage the roll is a roll of smaller width, then the slitting operation is not necessary, and so, the roll contained finished web of multilayer laminated packaging material has already been formed.

The rolls of smaller width containing finished web of multilayer laminated packaging material may undergo some final operations to prepare them to be shipped to client companies, such as trimming its edges to adjust its width and rewound them to form rolls of smaller diameter to adapt them to the necessary dimensions for being used in filling machines.

Further, by eliminating the lamination of a thermoplastic outer layer on the printable outer face of the paperboard layer then the laminating operation becomes less complex, thereby reducing costs.

Second Embodiment of the Process Object of the Invention

The second embodiment of the process object of the invention differs from the first embodiment of the invention in that the printing operation is made using regular water-based ink to print the artwork onto the printable outer face of the paperboard layer, instead of using protective highly chemical and abrasion resistant ink and thermo-sealing varnish onto the printable outer face of the paperboard layer; and further, after the printing operation of the artwork, a thermoplastic protective sealing outer layer is laminated onto the printed printable outer face of the paperboard layer of the web of multilayer laminated packaging material.

For this aim, the web of multilayer laminated packaging material is continuously fed to a laminating equipment for the lamination of the thermoplastic sealing outer layer onto the printed printable outer face of the paperboard layer of the multilayer laminated packaging material. The adhesion of the layers may be facilitated by heat treating the multilayer laminated packaging material. Alternatively, it is possible to continuously apply a chemical adhesive material between the printed printable outer face and the thermoplastic protective sealing outer layer of the multilayer laminated packaging material so as to cause the layers to adhere to each other during the laminating operation.

The protective sealing outer layer form the outer faces of the aseptic carton packages eventually produced from the web of multilayer laminated packaging material and serves to protect the printed artwork against humidity and scratching, as well as serving to enable adhesion during of the upper and lower sealing and closing regions and the upper and lower folded triangular flaps during the production of the finished aseptic carton packages in a filling machine.

The next steps are the same as described hereinbefore with respect to the first embodiment of the present invention.

Third Embodiment of the Process Object of the Invention

Figure 5:
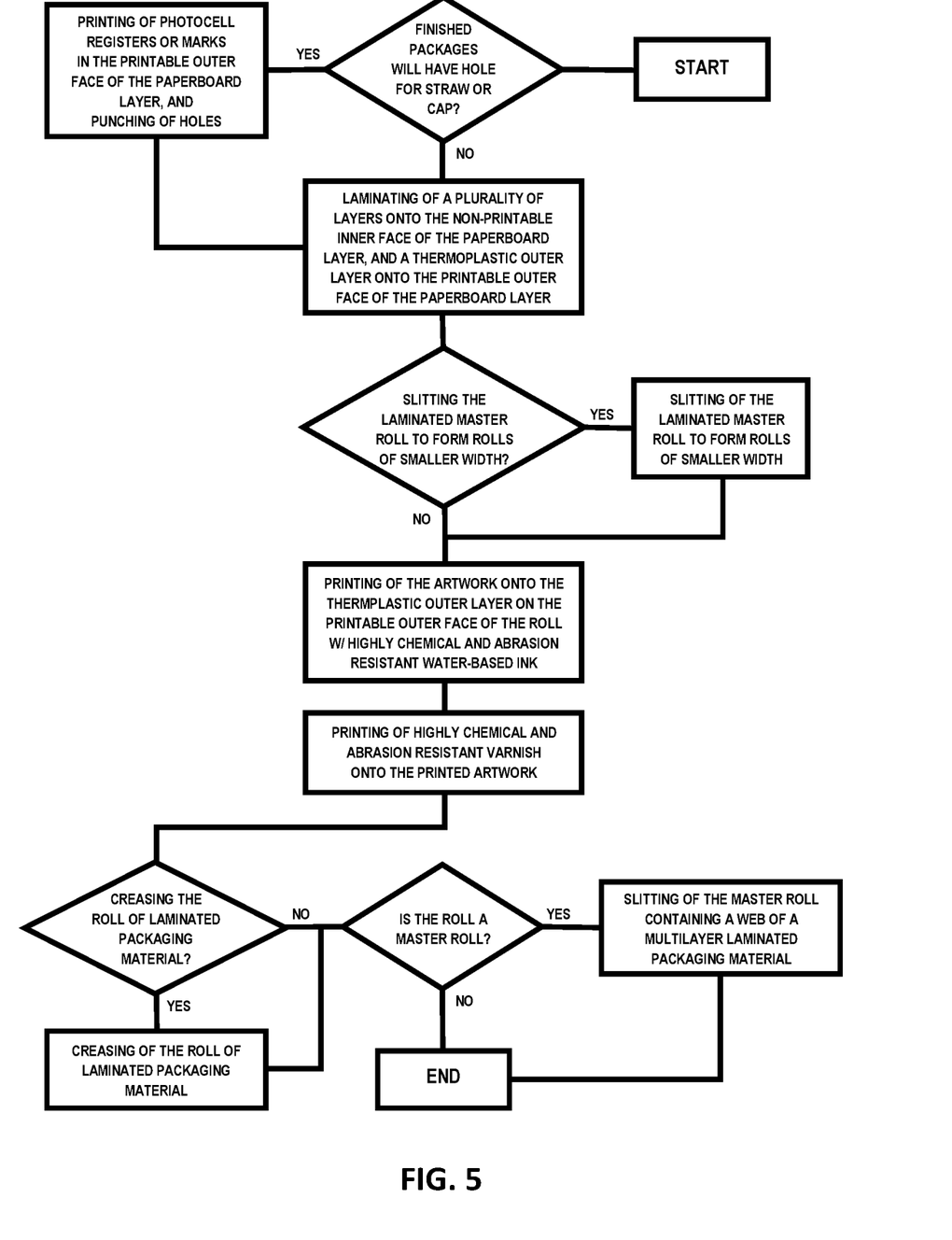
FIG. 5 depicts a block diagram showing the steps of a third embodiment of the process to manufacture multilayer laminated packaging material object of the invention.

FIG. 5 depicts a third embodiment of the process object of the invention, which initially comprise a first step wherein it is checked if the finished aseptic carton packages will use caps or straws. If so, then photocell marks or registers are continuously printed in the printable outer face of the paperboard layer, which will serve to orientate future printing operations with respect to said caps or straws which will occur after the laminating process, as will be described hereinafter. Next, holes for caps or straws are continuously punched in the paperboard layer.

Then the layer of paperboard is continuously fed to a laminating equipment in order to laminate in sequence a plurality of inner layers onto the non-printable inner face of the paperboard layer, comprising odour, light and gas (e.g., oxygen) barrier inner layer, adhesive inner layers and protective sealing inner layer, and a thermoplastic protective sealing outer layer is laminate onto the printable outer face of the paperboard layer, thereby forming a semi-finished web of multilayer laminated packaging material.

In an exemplary composition, said plurality of inner layers comprise a first thermoplastic adhesive inner layer, laminated between the non-printable inner face of the paperboard layer and an aluminum inner layer, a second thermoplastic adhesive inner layer laminated between the aluminum inner layer and a thermoplastic protective sealing inner layer.

In a following step it is decided if the master roll will be or not slit to form rolls of smaller width. The next step is a printing operation, which will be described hereinafter.

In the laminating operation described above the semi-finished web of multilayer laminated packaging material may undergo a heat treatment to facilitate the thermoplastic layers and the aluminum layer to adhere to the paperboard layer, which also contributes to heat and dry the paperboard layer, thereby contributing to improve its adhesion to the thermoplastic material of the layers. The heat treating may comprise, for exemplification only, flame treating or corona treating.

Alternatively, instead of using thermoplastic adhesive inner layers in the multilayer laminated packaging material, which requires heat to activate the thermoplastic layers, it is possible to continuously apply a chemical adhesive material to form the first and second adhesive inner layers between the paperboard layer and the aluminum inner layer, and between the aluminum inner layer and the thermoplastic protective sealing inner layer.

According to the third embodiment of the process of the invention, in the printing step, whatever is the roll that will be printed, a master roll or a slit roll, both will undergo the same printing operation, in that the web of multilayer laminated packaging material is fed to a printing equipment where an artwork is printed onto the thermoplastic protective sealing outer layer that coats the printable outer face of the paperboard layer. This printing operation may be made using both water-based ink or solvent-based ink, and the printing equipment may be a flexographic printing equipment or a rotogravure printing equipment.

Next, protective highly chemical and abrasion resistant varnish is applied onto the artwork.

The following step may be a creasing operation onto the non-printable inner face of the web of multilayer laminated packaging material contained in the roll, be it a master roll or a slit roll of smaller width. The creasing operation form folding lines needed for the production of the finished aseptic carton packages in filing machines. The folding lines will form the edges of the aseptic carton packages.

It is possible that the creasing operation is made in the filing machine itself. In this case the web of multilayer laminated packaging material will not be creased during the execution of the present process to manufacture multilayer laminated packaging material.

Being or being not made a creasing operation in the web of multilayer laminated packaging material, next, if the roll is a master roll, then it may be stocked for future use or may be slit to form rolls of smaller width containing a finished web of multilayer laminated packaging material.

If in this stage the roll is a roll of smaller width, then the slitting operation is not necessary, and so, the roll contained finished web of multilayer laminated packaging material has already been formed.

The rolls of smaller width containing finished web of multilayer laminated packaging material may undergo some final operations to prepare them to be shipped to client companies, such as trimming its edges to adjust its width and rewound them to form rolls of smaller diameter to adapt them to the necessary dimensions for being used in filling machines.

Benefits Obtained from the Embodiments of the Processes of the Invention

The embodiments of the process object of the invention provide great flexibility for manufacturing multilayer laminated packaging material used to produce aseptic carton packages, which is not observed in the processes known in the art, as shown in the following.

Since a creasing operation to form folding lines is made after the laminating operation, then the paperboard layer is substantially flat when the lamination process is undergoing, thereby facilitating adhesion of the first thermoplastic adhesive inner layer onto non-printable face of the paperboard layer during the laminating process.

By performing the printing operation after the laminating operation, it is possible to use the very expensive laminating equipment to produce very long runs of unprinted multilayer laminated packaging material, which can be stocked for future printing, or slit and stocked for future printing, thereby substantially reducing idle time of the laminating equipment.

The printing operation may be undergone both in the laminating facility or in remote printing facilities, or in both of them, enabling, for example, manufactures to strategically produce very long runs of non-printed master rolls of multilayer laminated packaging material in a few number of laminating facilities, causing an expressive reduction in operational downtime, thereby substantially reducing costs.

Is possible to manufacture rolls of smaller width of non-printed webs of multilayer laminated packaging material in laminating facilities and forward them to remote printing facilities strategically located, for future use, thereby enabling to rapidly fulfill client's orders using much less expensive printing equipment than the ones used in the processes known in the art.

Further, since the processes of the present invention enable the very expensive laminating equipment to produce very long runs of unprinted multilayer laminated packaging material with no outer layers, consequently it is necessary to have fewer pieces of said very expensive laminating equipment to produce the same quantity of rolls of multilayer laminated packaging material produced in facilities where the processes known in the art are used.

Moreover, the embodiments of the process object of the invention enable to store non-printed rolls of multilayer laminated packaging material in any location, irrespective of the local relative humidity, as the non-printable inner face of the paperboard layer of the multilayer laminated packaging material is no longer exposed to humidity.

Consequently, it is not necessary to store the not already printed rolls in special climate conditions, thereby resulting in lower storage costs. Therefore, the printing facilities may be located in the same location of the plant where the laminating and printing equipment are located, or in strategic remote locations near relevant clients, or in both locations, in accordance with convenient market strategies.

It is noted that the embodiments of the process object of the invention make possible to use less expensive printing equipment to print the commercial artwork of the products which will be packaged in aseptic laminated packaging material, instead of to use large and expensive broadband printing equipment.

The embodiments of the process object of the present invention allow a substantial reduction in capital expenditure (CAPEX) for new ventures or to expand existing facilities, as well as substantially reduce the operating expenditure (OPEX), thereby giving rise to new and non-conventional options for the manufactures to establish their market strategies.

The present invention was described according to its preferred embodiments. Modifications and substitutions can be made in the invention, without, however, departing from the teachings disclosed herein.

Therefore, the present invention is not limited to the embodiments disclosed herein, being only limited by the scope of the following claims.

All publications herein are incorporated by reference to the same extent as if each individual publication or patent application was specifically and individually indicated to be incorporated by reference.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A process to manufacture multilayer laminated packaging material to produce carton packages comprising the steps of:
feeding a paperboard layer to a laminating equipment;
laminating at least one inner layer onto a non-printable inner face of said paperboard layer, thereby forming a web of a multilayer laminated packaging material, wherein the at least one laminated inner layer forms a protective sealing and odour, light and gas barrier layer;
winding said web of the multilayer laminated packaging material to form a master roll;
feeding said master roll containing the web of the multilayer laminated packaging material to a printing equipment;
printing a commercial artwork onto a printable outer face of the paperboard layer of the web of the multilayer laminated packaging material, opposed to said non-printable inner face;
winding the printed web of the multilayer laminated packaging material to form a printed master roll; and
slitting the printed master roll to form rolls of smaller width containing the web of the multilayer laminated packaging material.

2. The process according to claim 1, wherein the at least one laminated inner layer that forms a protective sealing, odour, light and gas barrier inner layer, comprises i) a first adhesive inner layer; ii) an aluminum inner layer; iii) a second adhesive inner layer; and iv) a protective sealing inner layer; and wherein said laminating comprises an operation selected from the group consisting of:
i) laminating the first adhesive inner layer onto the non-printable inner face of the paperboard layer, wherein the first adhesive inner layer is a thermoplastic adhesive inner layer; laminating the aluminum inner layer onto the first adhesive inner layer; laminating the second adhesive inner layer onto the aluminum odour, light and gas barrier inner layer, wherein the second adhesive inner layer is a thermoplastic adhesive inner layer; laminating the thermoplastic protective sealing inner layer onto the second adhesive inner layer, wherein the first and second adhesive inner layers and the protective sealing inner layer comprise thermoplastic layers; and
ii) continuously applying a chemical adhesive material layer onto the non-printable inner face of the paperboard layer to form the first adhesive inner layer; laminating the odour, light and gas barrier inner layer onto the first adhesive inner layer; laminating an adhesive material onto the odour, light and gas barrier inner layer to form the second adhesive inner layer; and laminating the protective sealing inner layer onto the second adhesive inner layer, wherein the odour, light and gas barrier inner layer comprises aluminum layer, and the protective sealing inner layer comprises thermoplastic layer.

3. The process according to claim 2, in that:
said step of printing a commercial artwork onto the printable outer face of the paperboard layer of the multilayer laminated packaging material comprises the use of highly chemical and abrasion resistant ink for printing said artwork, further comprising the steps of:
applying protective highly chemical and abrasion resistant varnish onto the printed artwork;
applying thermo sealing varnish onto border regions of the printable outer face of the multilayer laminated packaging material which will be superimposed by a border of the opposite inner face containing the odour, light and gas barrier inner layer, adhesive inner layers and a thermoplastic protective sealing inner layer in a future tunneling process to produce aseptic carton packages using said multilayer laminated packaging material; and
applying thermo sealing varnish onto regions of the printable outer face of the multilayer laminated packaging material which will have to adhere to each other to form upper and lower folding flaps of the finished aseptic carton packages.

4. The process according to claim 3, further comprising the steps of:
feeding of said web of the multilayer laminated packaging material to a creasing equipment; and
creasing of said non-printable inner face of the web of the multilayer laminated packaging material to form folding lines.

5. The process according to claim 2, further comprising the steps of:
laminating a thermoplastic protective sealing outer layer onto the already printed printable outer face of the paperboard layer of the web of multilayer laminated packaging material, wherein the laminating comprises an operation selected from the group consisting of:
i) laminating the thermoplastic protective sealing outer layer onto the printable outer face of the paperboard layer of the web of multilayer laminated packaging material; and
ii) continuously applying a chemical adhesive material onto the printable outer face of the paperboard layer of the web of multilayer laminated packaging material and laminating the thermoplastic protective sealing outer layer onto the chemical adhesive material.

6. The process according to claim 5, further comprising the steps of:
feeding said web of the multilayer laminated packaging material to a creasing equipment; and
creasing said non-printable inner face of the web of the multilayer laminated packaging material to form folding lines.

7. The process according to claim 2, in that prior to feeding the layer of paperboard to a laminating equipment, photocell registers are printed on a printable outer face of the paperboard layer and holes are punched in the paperboard layer to allow the passage of elements that will perforate the aluminum inner layer of the finished packages manufactured from the multilayer laminated packaging material.

8. The process according to claim 7, in that:
said step of printing the commercial artwork onto the printable outer face of the paperboard layer of the multilayer laminated packaging material comprises the use of highly chemical and abrasion resistant ink for printing said artwork, further comprising the steps of:
applying protective highly chemical and abrasion resistant varnish onto the printed artwork;
applying thermo sealing varnish onto border regions of the printable outer face of the multilayer laminated packaging material which will be superimposed by a border of the opposite inner face containing the odour, light and gas barrier inner layer, adhesive inner layers and a thermoplastic protective sealing inner layer in a future tunneling process to produce aseptic carton packages using said multilayer laminated packaging material; and
applying thermo sealing varnish onto regions of the printable outer face of the multilayer laminated packaging material which will have to adhere to each other to form upper and lower folding flaps of the finished aseptic carton packages.

9. The process according to claim 8, further comprising the steps of:
feeding of said web of the multilayer laminated packaging material to a creasing equipment; and
creasing of said non-printable inner face of the web of the multilayer laminated packaging material to form folding lines.

10. The process according to claim 7, further comprising the steps of:
laminating a thermoplastic protective sealing outer layer onto the already printed printable outer face of the paperboard layer of the web of multilayer laminated packaging material of the printed master roll, wherein the laminating comprises an operation selected from the group consisting of:
  i) laminating the thermoplastic protective outer sealing outer layer onto the printable outer face of the paperboard layer of the web of multilayer laminated packaging material; and
  ii) applying a chemical adhesive material onto the printable outer face of the paperboard layer and laminating the thermoplastic protective sealing outer layer onto the chemical adhesive material.

11. The process according to claim 10, further comprising the steps of:
feeding said web of a multilayer laminated packaging material to a creasing equipment; and
creasing said non-printable inner face of the web of the multilayer laminated packaging material to form folding lines.

12. A process to manufacture multilayer laminated packaging material to produce carton packages comprising the steps of:
feeding a paperboard layer to a laminating equipment;
laminating at least one inner layer onto the non-printable inner face of said paperboard layer, thereby forming a web of a multilayer laminated packaging material, wherein the at least one laminated inner layer forms a protective sealing and odour, light and gas barrier inner layer;
winding said web of the multilayer laminated packaging material to form a master roll;
slitting the non-printed master roll to form rolls of smaller width containing the web of a multilayer laminated packaging material;
feeding each of said slit rolls containing the web of the multilayer laminated packaging material to a printing equipment;
printing a commercial artwork onto a printable outer face of the paperboard layer of the web of multilayer laminated packaging material, opposed to said non-printable inner face; and
winding the printed web of the multilayer laminated packaging material to form a printed slit roll.

13. The process according to claim 12, wherein said at least one laminated inner layer that forms a protective sealing, odour, light and gas barrier inner layer, comprises i) a first adhesive inner layer; ii) an aluminum inner layer; iii) a second adhesive inner layer; and iv) a thermoplastic protective sealing inner layer; and said laminating comprises an operation selected from the group consisting of:
  i) laminating the first adhesive inner layer onto the non-printable inner face of the paperboard layer, wherein the first adhesive inner layer is a thermoplastic adhesive inner layer; laminating the odour, light and gas barrier inner layer onto the first adhesive inner layer; laminating the second adhesive inner layer onto the odour, light and gas barrier inner layer, wherein the second adhesive inner layer is a thermoplastic adhesive inner layer; and laminating the thermoplastic protective sealing inner layer onto the second adhesive inner layer, wherein the odour, light and gas barrier inner layer comprises aluminum layer; and
  ii) continuously applying a chemical adhesive material inner layer onto the non-printable inner face of the paperboard layer to form the first adhesive inner layer; laminating the odour, light and gas barrier inner layer onto the first adhesive inner layer; laminating an adhesive material onto the odour, light and gas barrier inner layer to form the second adhesive inner layer; and laminating a protective sealing inner layer onto the second adhesive inner layer, wherein the odour, light and gas barrier inner layer comprises a aluminum layer, and the protective sealing inner layer comprises a thermoplastic layer.

14. The process according to claim 13, in that:
said step of printing the commercial artwork onto the printable outer face of the paperboard layer of the multilayer laminated packaging material comprises the use of highly chemical and abrasion resistant ink for printing said artwork, further comprising the steps of:
applying protective highly chemical and abrasion resistant varnish onto the printed artwork;
applying thermo sealing varnish onto border regions of the printable outer face of the multilayer laminated packaging material which will be superimposed by a border of the opposite inner face containing the odour, light and gas barrier inner layer, adhesive inner layers and a thermoplastic protective sealing inner layer in a future tunneling process to produce aseptic carton packages using said multilayer laminated packaging material; and
applying thermo sealing varnish onto regions of the printable outer face of the multilayer laminated packaging material which will have to adhere to each other to form upper and lower folding flaps of the finished aseptic carton packages.

15. The process according to claim 14, further comprising the steps of:

feeding said web of the multilayer laminated packaging material to a creasing equipment; and
creasing said non-printable inner face of the web of the multilayer laminated packaging material to form folding lines.

16. The process according to claim 13, further comprising the steps of:
laminating a thermoplastic protective sealing outer layer onto the already printed printable outer face of the paperboard layer of the web of multilayer laminated packaging material, wherein the laminating comprises an operation selected from the group consisting of:
i) laminating the thermoplastic protective sealing outer layer onto the printable outer face of the paperboard layer of the web of multilayer laminated packaging material; and
ii) continuously applying a chemical adhesive material onto the printable outer face of the paperboard layer of the web of multilayer laminated packaging material and laminating the thermoplastic protective sealing outer layer onto the chemical adhesive material.

17. The process according to claim 16, further comprising the steps of:
feeding said web of the multilayer laminated packaging material to a creasing equipment; and
creasing said non-printable inner face of the web of the multilayer laminated packaging material to form folding lines.

18. The process according to claim 13, in that prior to feeding the layer of paperboard to a laminating equipment, photocell registers are printed on the printable outer face of the paperboard layer and holes are punched in the paperboard layer to allow the passage of elements that will perforate the aluminum inner layer of the finished packages manufactured from the multilayer laminated packaging material.

19. The process according to claim 18, in that:
said step of printing the commercial artwork onto the printable outer face of the paperboard layer of the multilayer laminated packaging material comprises the use of highly chemical and abrasion resistant ink for printing said artwork, further comprising the steps of:
applying protective highly chemical and abrasion resistant varnish onto the printed artwork;
applying thermo sealing varnish onto border regions of the printable outer face of the multilayer laminated packaging material which will be superimposed by a border of the opposite inner face containing the odour, light and gas barrier inner layer, adhesive inner layers and a thermoplastic protective sealing inner layer in a future tunneling process to produce aseptic carton packages using said multilayer laminated packaging material; and
applying thermo sealing varnish onto the regions of the printable outer face of the multilayer laminated packaging material which will have to adhere to each other to form upper and lower folding flaps of the finished aseptic carton packages.

20. The process according to claim 18, further comprising the steps of:
feeding said web of a multilayer laminated packaging material to a creasing equipment; and
creasing said non-printable inner face of the web of the multilayer laminated packaging material to form folding lines.

21. The process according to claim 18, further comprising the steps of:
laminating a thermoplastic protective sealing outer layer onto the already printed printable outer face of the paperboard layer of the web of multilayer laminated packaging material of the printed master roll, wherein the laminating comprises an operation selected from the group consisting of:
i) laminating the thermoplastic protective sealing outer layer onto the printable outer face of the paperboard layer and heat treating the web of multilayer laminating packaging material; and
ii) applying a chemical adhesive material onto the printable outer face of the paperboard layer and laminating the thermoplastic protective sealing outer layer onto the chemical adhesive material.

22. The process according to claim 21, further comprising the steps of:
feeding said web of the multilayer laminated packaging material to a creasing equipment; and
creasing said non-printable outer face of the web of the multilayer laminated packaging material to form folding lines.

23. A process to manufacture multilayer laminated packaging material to produce carton packages comprising the steps of:
feeding a paperboard layer to a laminating equipment;
laminating at least one layer onto the non-printable inner face of said paperboard layer, wherein the at least one laminated inner layer forms a protective sealing and odour, light and gas barrier; and laminating a thermoplastic protective sealing outer layer onto the printable outer face of the paperboard layer; thereby forming a web of a multilayer laminated packaging material;
winding said web of the multilayer laminated packaging material to form a master roll;
feeding said master roll containing the web of the multilayer laminated packaging material to a printing equipment;
printing a commercial artwork onto the thermoplastic outer layer on the printable outer face of the paperboard layer of the web of the multilayer laminated packaging material, opposed to said non-printable inner face;
winding the printed web of the multilayer laminated packaging material to form a printed master roll; and
slitting the printed master roll to form rolls of smaller width containing the web of the multilayer laminated packaging material.

24. The process according to claim 23, wherein:
the web of the multilayer laminated packaging material is creased after printing of the commercial artwork onto the thermoplastic outer layer on the printable outer face of the paperboard layer of the web of the multilayer laminated packaging material;
said at least one protective sealing, odour, light and gas barrier inner layer comprises i) a first adhesive inner layer; ii) an aluminum inner layer; iii) a second adhesive inner layer; and iv) a thermoplastic protective sealing inner layer; and
said laminating at least one layer onto a non-printable inner face of said paperboard layer comprises an operation selected from the group consisting of:
i) laminating a first adhesive inner layer onto the non-printable inner face of said paperboard layer, wherein the first adhesive inner layer is a thermoplastic adhesive layer; laminating an aluminum inner layer onto the first adhesive inner layer; laminating a second adhesive inner layer onto the aluminum inner layer, wherein the second adhesive inner layer is a thermoplastic adhesive layer; and laminating a thermoplastic protective sealing inner layer onto the second adhesive inner layer; and ii) continuously applying a first chemical adhesive material onto the non-printable inner face of said paperboard layer; laminating an aluminum inner layer onto the first chemical adhesive material; laminating a second chemical adhesive material onto the aluminum inner layer, and laminating a thermoplastic protective sealing inner layer onto the second adhesive material;

said application of a thermoplastic protective sealing outer layer onto the printable outer face of the paperboard layer of the web of the multilayer laminated packaging material comprises an operation selected from the group consisting of:

i) laminating a thermoplastic sealing outer layer onto the printable outer face of said paperboard layer to form a thermoplastic protective sealing outer layer; and ii) continuously applying a chemical adhesive material onto the printable outer face of said paperboard layer and laminating a thermoplastic protective sealing outer layer onto the adhesive material.

25. A process to manufacture multilayer laminated packaging material to produce carton packages comprising the steps of:

feeding a paperboard layer to a laminating equipment;

laminating at least one layer onto a non-printable inner face of said paperboard layer, wherein the at least one laminated inner layer forms a protective sealing and odour, light and gas barrier; and laminating a thermoplastic protective sealing outer layer onto the printable face of the paperboard layer; thereby forming a web of a multilayer laminated packaging material;

winding said web of the multilayer laminated packaging material to form a master roll;

slitting the non-printed master roll to form rolls of smaller width containing the web of the multilayer laminated packaging material;

feeding of said slit rolls of smaller width containing the web of the multilayer laminated packaging material to a printing equipment;

printing a commercial artwork onto the thermoplastic outer layer on the printable face of the web of paperboard layer of the multilayer laminated packaging material, opposed to said non-printable face; and winding of the printed web of the multilayer laminated packaging material to form a printed slit roll.

26. The process according to claim 25, wherein:

the web of the multilayer laminated packaging material is creased after printing of the commercial artwork onto the thermoplastic outer layer on the printable outer face of the paperboard layer of the web of the multilayer laminated packaging material;

said at least one protective sealing, odour, light and gas barrier inner layer comprises i) a first adhesive inner layer; ii) an aluminum inner layer; iii) a second adhesive inner layer; and iv) a thermoplastic protective sealing inner layer; and said laminating at least one layer onto a non-printable inner face of said paperboard layer comprises an operation selected from the group consisting of:

i) laminating a first adhesive inner layer onto the non-printable inner face of said paperboard layer, wherein the first adhesive layer is a thermoplastic adhesive layer; laminating an aluminum inner layer onto the first adhesive inner layer; laminating the second adhesive inner layer onto the aluminum inner layer, wherein the second adhesive inner layer is a thermoplastic adhesive layer; and laminating a protective thermoplastic sealing inner layer onto the second adhesive inner layer; and ii) continuously applying a first chemical adhesive material onto the non-printable face of said paperboard layer; laminating an aluminum inner layer onto the first chemical adhesive material; laminating a second chemical adhesive material onto the aluminum inner layer; and laminating a thermoplastic protective sealing inner layer onto the second adhesive material;

said application of a thermoplastic protective sealing outer layer onto the printable outer face of the paperboard layer of the web of the multilayer laminated packaging material comprises an operation selected from the group consisting of:

i) laminating a thermoplastic sealing outer layer onto the printable outer face of said paperboard layer to form a thermoplastic protective sealing outer layer; and ii) continuously applying a chemical adhesive material onto the printable outer face of said paperboard layer and laminating a thermoplastic protective sealing outer layer onto the adhesive material during the lamination.

* * * * *